(12) United States Patent
Iwase et al.

(10) Patent No.: US 12,535,915 B2
(45) Date of Patent: Jan. 27, 2026

(54) DRIVER, DISPLAY TOUCH PANEL, AND CONTROLLER FOR STOPPING AND RESUMING OPERATION OF A GATE DRIVER

(71) Applicant: Sharp Display Technology Corporation, Kameyama (JP)

(72) Inventors: Yasuaki Iwase, Kameyama (JP); Seijirou Gyouten, Kameyama (JP); Satoshi Horiuchi, Kameyama (JP); Shinji Matsubara, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/892,844

(22) Filed: Sep. 23, 2024

(65) Prior Publication Data

US 2025/0123716 A1    Apr. 17, 2025

(30) Foreign Application Priority Data

Oct. 13, 2023    (JP) ................................ 2023-177896

(51) Int. Cl.
*G06F 3/041*    (2006.01)
*G09G 3/36*    (2006.01)
*G09G 3/3266*    (2016.01)

(52) U.S. Cl.
CPC ....... *G06F 3/04184* (2019.05); *G09G 3/3677* (2013.01); *G09G 3/3266* (2013.01); *G09G 2310/0267* (2013.01); *G09G 2310/08* (2013.01)

(58) Field of Classification Search
CPC .............. G06F 3/04184; G09G 3/3677; G09G 3/3266; G09G 2310/0267; G09G 2310/08
See application file for complete search history.

(56) References Cited

U.S. PATENT DOCUMENTS

2018/0196563 A1    7/2018  Iwase et al.
2023/0229249 A1*   7/2023  Sasaki .................. G06F 3/0412
                                                            345/174

FOREIGN PATENT DOCUMENTS

WO        2017/006815 A1    1/2017

* cited by examiner

*Primary Examiner* — Liliana Cerullo
(74) *Attorney, Agent, or Firm* — ScienBiziP, P.C.

(57) ABSTRACT

A drive circuit includes a plurality of stages and configured to supply a drive signal to a scanning signal line group in response to input of a plurality of clock signals. The drive circuit includes a plurality of unit circuits respectively constituting the plurality of stages, the plurality of unit circuits being configured to output the drive signal, a latch circuit provided in parallel with the plurality of unit circuits, and a connection circuit connected to an output node of the latch circuit.

7 Claims, 19 Drawing Sheets

DRIVER, DISPLAY TOUCH PANEL, AND CONTROLLER FOR STOPPING AND RESUMING OPERATION OF A GATE DRIVER

CROSS-REFERENCE TO RELATED APPLICATIONS

This application claims the benefit of priority to Japanese Patent Application Number 2023-177896 filed on Oct. 13, 2023. The entire contents of the above-identified application are hereby incorporated by reference.

BACKGROUND

Technical Field

The disclosure relates to a drive circuit, a display device, an in-cell touch panel device, and a control device for a drive circuit.

WO 2017/006815 discloses a drive circuit capable of stopping an operation during scanning. The drive circuit (shift register) includes a plurality of unit circuits constituting a plurality of stages, respectively. The plurality of unit circuits include a first unit circuit that outputs a shift pulse to the gate bus line and a subsequent stage, and a second unit circuit that outputs a shift pulse to the subsequent stage. The second unit circuit includes a transistor having a first electrode connected to the subsequent stage and an internal node connected to a control electrode of the transistor. The potential of the internal node is continuously maintained at a high level while the operation of the drive circuit is stopped. Then, the level of the signal supplied to the second electrode of the transistor becomes high at a time slightly before the time at which the operation of the drive circuit is to be resumed. Accordingly, the transistor that has entered the ON state due to the internal node maintained at the high level outputs a shift pulse to the subsequent stage and the operation of the drive circuit is resumed.

SUMMARY

In the drive circuit as described in WO 2017/006815, the first unit circuit and the second unit circuit (latch circuit) are connected in series, and the latch circuit constitutes a part of the plurality of stages. For this reason, since the operation of the drive circuit in the related art is necessarily stopped by the latch circuit, it is not possible to arbitrarily set whether an operation of the drive circuit is stopped by using the latch circuit.

Therefore, the disclosure has been made to solve the above-described problem, and an object thereof is to provide a drive circuit, a display device, an in-cell touch panel device, and a control device for a drive circuit capable of arbitrarily setting whether to stop an operation of the drive circuit by using a latch circuit.

To solve the above-described problems, a drive circuit according to a first aspect of the disclosure is a drive circuit that includes a plurality of stages and is configured to supply a drive signal to a scanning signal line group in response to input of a plurality of clock signals, the drive circuit including a plurality of unit circuits respectively constituting the plurality of stages, the unit circuits being configured to output the drive signal, a latch circuit provided in parallel with the plurality of unit circuits, and a connection circuit connected to an output node of the latch circuit, in which the latch circuit receives input of a first output signal from a first unit circuit constituting a first stage among the plurality of unit circuits as a first set signal, outputs a latch circuit output signal to the connection circuit via the output node when a first control signal that resumes an operation of the drive circuit is input after the first set signal is input, and receives input of a second output signal from a second unit circuit constituting a second stage among stages subsequent to the first stage among the plurality of unit circuits as a first reset signal, and the connection circuit includes a reset circuit configured to reset the first unit circuit and a third unit circuit constituting a stage next to the first stage among the plurality of unit circuits in response to input of a second control signal that stops an operation of the drive circuit, and a set circuit configured to supply the latch circuit output signal to the third unit circuit as a second set signal.

A display device according to a second aspect includes the drive circuit according to the first aspect and a display in which the scanning signal line group is disposed.

An in-cell touch panel device according to a third aspect includes the drive circuit according to the first aspect and an in-cell touch panel provided with the scanning signal line group and configured to detect a touch of a pointer in a period in which an operation of the drive circuit is stopped.

In a control device for a drive circuit according to a fourth aspect, the control device supplies, to the drive circuit according to the first aspect, the plurality of clock signals, the first control signal, and the second control signal, in which the drive circuit includes a plurality of latch circuits provided in parallel with the plurality of unit circuits, and a plurality of connection circuits connected to output nodes of the plurality of latch circuits, respectively, and the control device for the drive circuit determines an operation connection circuit to be operated from among the plurality of connection circuits, and supplies the second control signal to the operation connection circuit to be operated, without supplying the second control signal to a connection circuit other than the operation connection circuit to be operated among the plurality of connection circuits.

According to the above configuration, since the latch circuit is connected in parallel with the plurality of unit circuits, the operation of the drive circuit is not stopped by the latch circuit and the operation of the drive circuit can be continued unless the second control signal that stops the operation of the drive circuit is supplied to the drive circuit. In addition, when the second control signal is supplied to the drive circuit, the operation of the drive circuit can be stopped, and when the first control signal is supplied to the drive circuit, the operation of the drive circuit can be resumed. As a result, it is possible to arbitrarily set whether the latch circuit stops the operation of the drive circuit.

BRIEF DESCRIPTION OF DRAWINGS

The disclosure will be described with reference to the accompanying drawings, wherein like numbers reference like elements.

DESCRIPTION OF EMBODIMENTS

Figure 1:
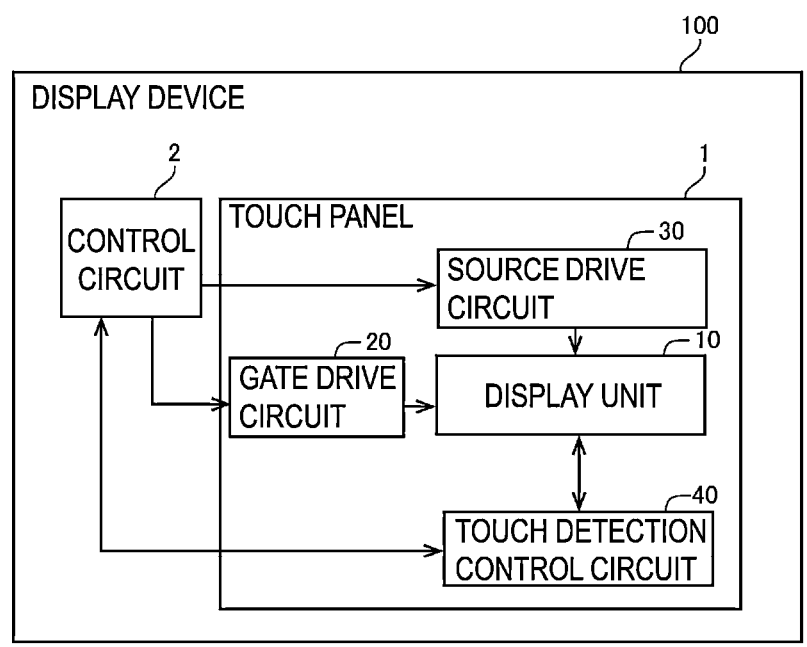
FIG. 1 is a block diagram illustrating a configuration of a display device 100 according to a first embodiment.

Hereinafter, embodiments of the disclosure will be described in detail with reference to the drawings. In the drawings, the same or corresponding portions are denoted by the same reference signs, and the description thereof will not be repeated. Note that, for ease of description, in the drawings referred to below, configurations may be simplified or schematically illustrated, and some components may be omitted. Further, dimensional ratios between components illustrated in the drawings are not necessarily indicative of actual dimensional ratios.

First Embodiment

Overall Configuration of Display Device

Figure 2:
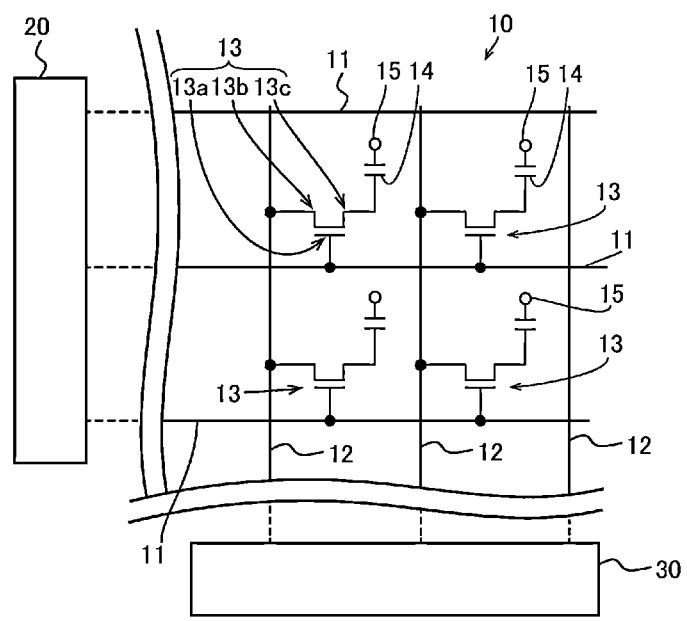
FIG. 2 is a schematic circuit diagram illustrating a configuration of a display unit 10.
Figure 3:
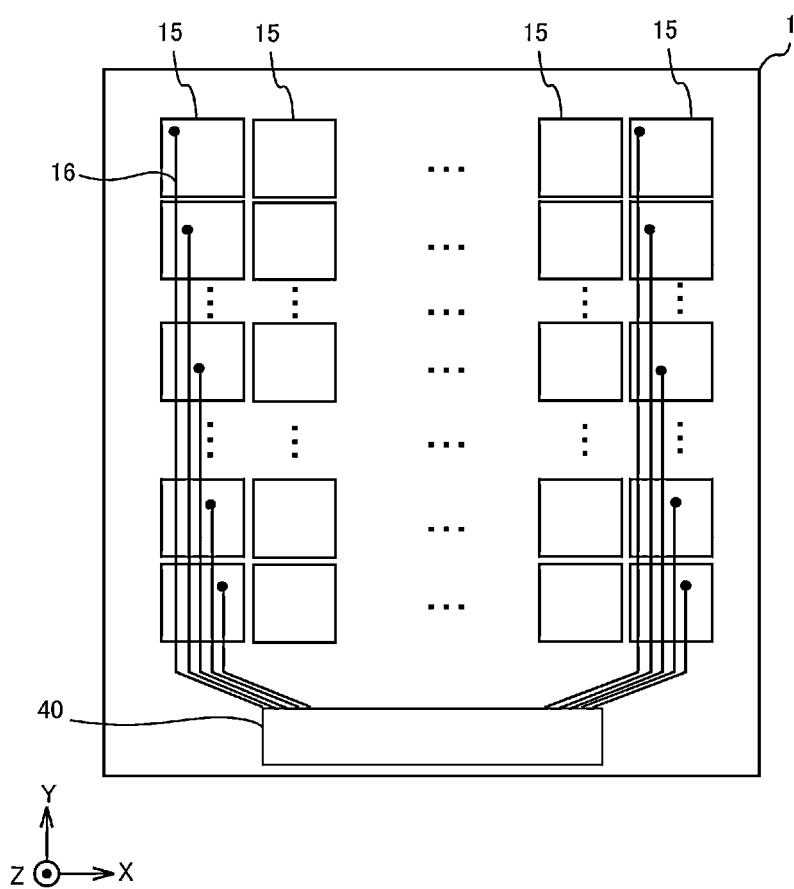
FIG. 3 is a diagram illustrating a configuration of a touch panel 1.

A configuration of a display device 100 according to a first embodiment will be described. FIG. 1 is a block diagram illustrating the configuration of the display device 100 according to the first embodiment. FIG. 2 is a schematic circuit diagram illustrating a configuration of a display unit 10. FIG. 3 is a diagram illustrating a configuration of a touch panel 1.

As illustrated in FIG. 1, the display device 100 includes the touch panel 1 and a control circuit 2. In the first embodiment, the touch panel 1 is configured as an in-cell touch panel that realizes a touch detection function and a video display function. That is, the touch panel 1 also serves as a display. Furthermore, in the first embodiment, the display device 100 is an in-cell touch panel device.

The control circuit 2 includes a processor that executes a control process for the display device 100. In addition, the control circuit 2 transmits a control signal to the touch panel 1 based on an input video signal. The touch panel 1 displays a video based on the control signal. In addition, the control circuit 2 transmits a command for detecting a touch with the touch panel 1 and receives information indicating touch coordinates of a pointer from the touch panel 1 (hereinafter, referred to as "touch detection processing"). In addition, the control circuit 2 performs a display process of causing the gate drive circuit 20 to perform an operation and a touch detection process in a time-sharing manner during one frame period. That is, one frame period includes a touch detection period TP (see FIG. 10) in which the touch detection process is performed and a display period TD (see FIG. 7) in which the display process is performed. The control circuit 2 executes, for example, the touch detection process a plurality of times during one frame period. In addition, in a period in which the touch detection process is performed, an operation of the gate drive circuit 20 is paused. In addition, a pause period TR (see FIG. 10) during which an operation of the gate drive circuit 20 is paused includes the touch detection period TP.

Figure 9:
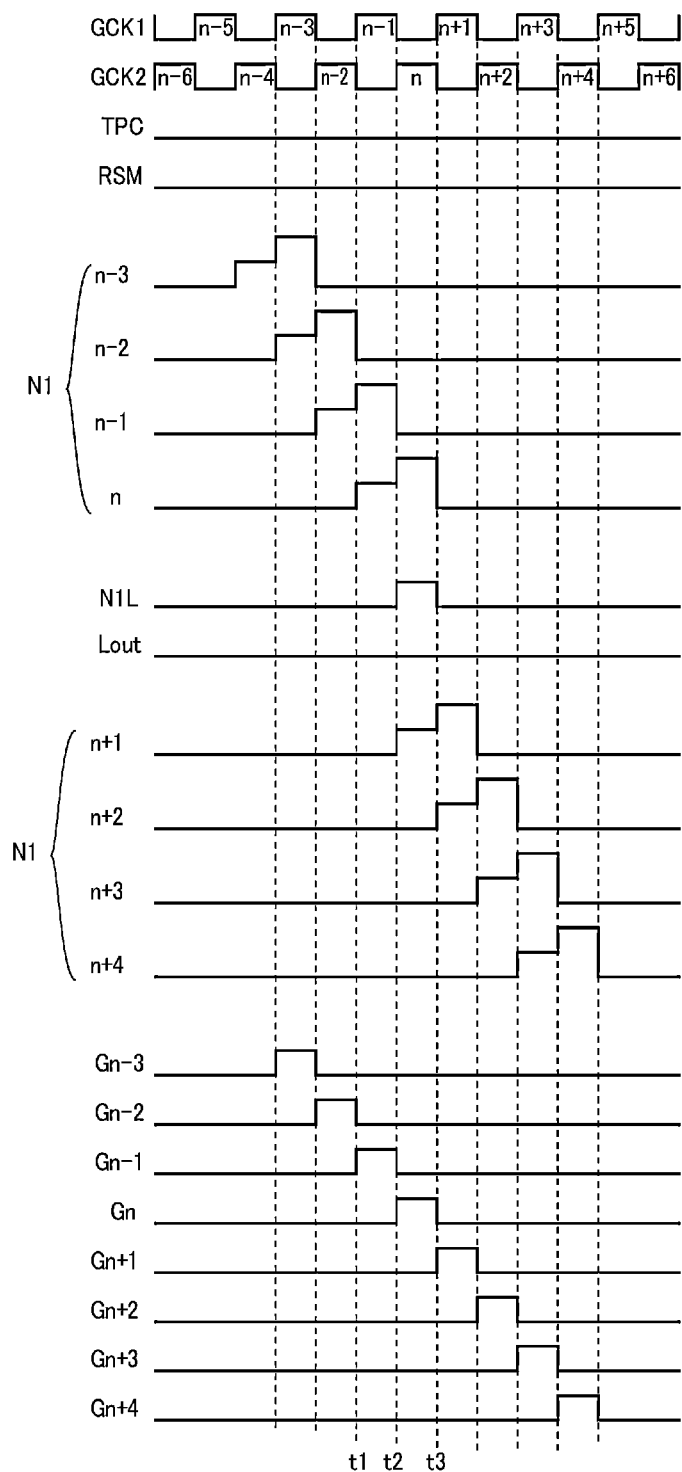
FIG. 9 is a timing chart of each signal in a gate drive circuit 20 by drive without pause.
Figure 10:
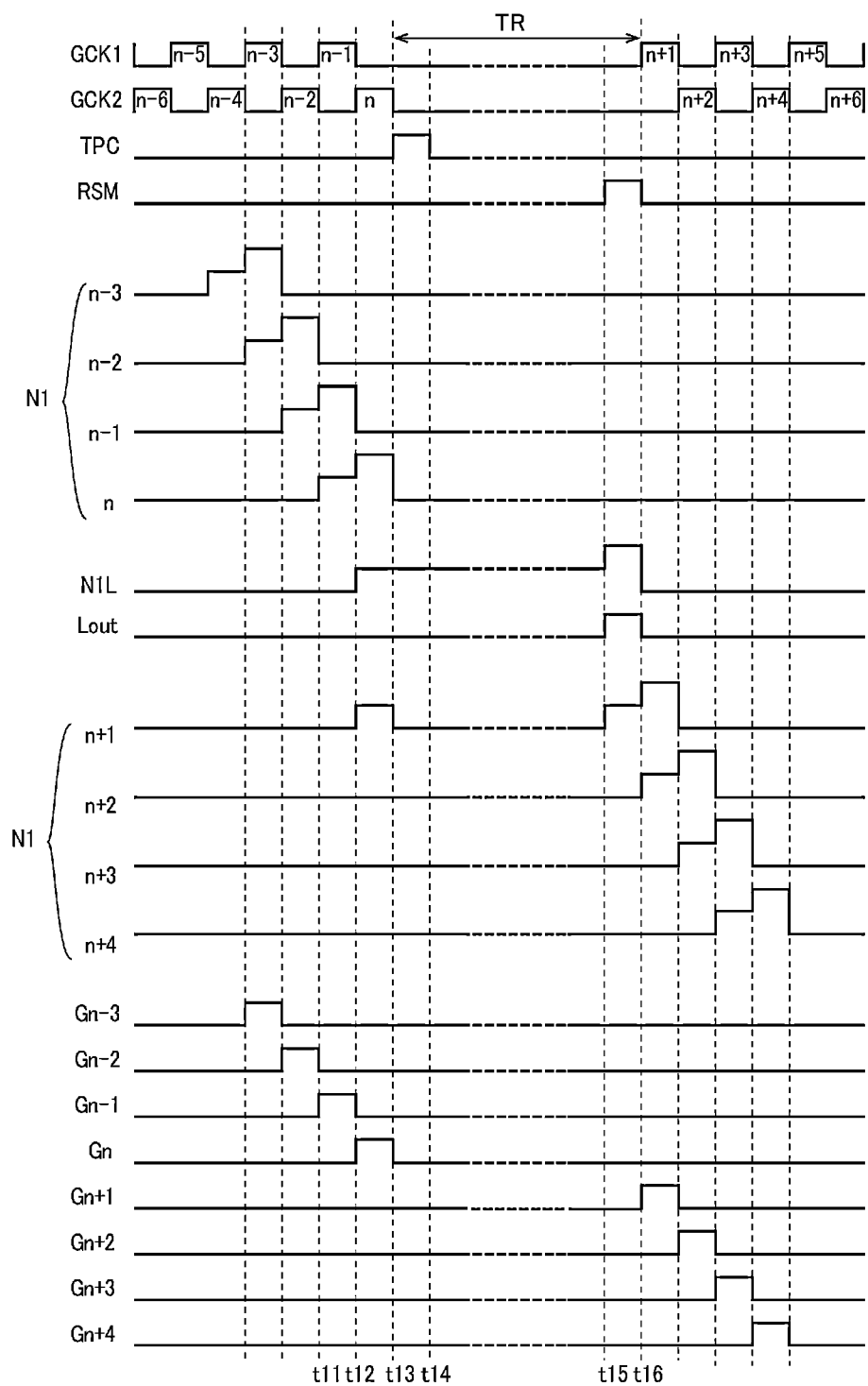
FIG. 10 is a timing chart of each signal in a gate drive circuit 20 by drive with a pause.

In addition, in the first embodiment, the control circuit 2 is configured to perform control of switching between a state in which an operation of the gate drive circuit 20 is not paused (see FIG. 9) and a state in which an operation of the gate drive circuit 20 is paused in the pause period TR in one frame period (see FIG. 10). For example, when the touch panel 1 is used as a display having no touch detection function, the control circuit 2 performs control in a state in which the operation of the gate drive circuit 20 is not paused (hereinafter referred to as "drive without pause"), and when the touch detection function of the touch panel 1 is used, the control circuit 2 performs control in a state in which the operation of the gate drive circuit 20 is paused in the pause period TR in one frame period (hereinafter referred to as "drive with a pause").

The touch panel 1 includes a display unit 10, the gate drive circuit 20, a source drive circuit 30, and a touch detection control circuit 40 as illustrated in FIG. 1. Note that, although FIG. 1 illustrates that the gate drive circuit 20, the source drive circuit 30, and the touch detection control circuit 40 are provided in the touch panel 1, at least one of the gate drive circuit 20, the source drive circuit 30, and the touch detection control circuit 40 may be provided on another substrate disposed outside the touch panel 1. In this case, the touch panel 1 and at least one of the gate drive circuit 20, the source drive circuit 30, and the touch detection control circuit 40 are connected by a wire or a flexible printed circuit board.

The display unit 10 includes a plurality of gate lines 11, a plurality of source lines 12, a plurality of transistors 13, a plurality of pixel electrodes 14, and a plurality of common electrodes 15 as illustrated in FIG. 2. The plurality of gate lines 11 intersect the plurality of source lines 12 in a plan view. In addition, the transistors 13 and the pixel electrodes 14 are disposed in each of regions defined by the plurality of gate lines 11 and the plurality of source lines 12. In addition, each transistor 13 includes a gate electrode 13a, a source electrode 13b, and a drain electrode 13c. The gate electrode 13a is connected to one of a plurality of gate lines 11. In addition, the source electrode 13b is connected to one of the plurality of source lines 12. The drain electrode 13c is connected to the pixel electrode 14. The plurality of gate lines 11 is an example of a scanning signal line group. Note that, although FIG. 2 illustrates an example in which the gate drive circuit 20 is disposed on one side of the display unit 10, the gate drive circuits 20 may be disposed on both sides of the display unit 10.

The gate drive circuit 20 is formed (monolithically formed) on the substrate of the touch panel 1. The gate drive circuit 20 sequentially outputs gate signals to the plurality of gate lines 11. The source drive circuit 30 is mounted on the substrate of the touch panel 1. The source drive circuit 30 receives a video signal and a source control signal output from the control circuit 2, and generates a source signal (data signal) based on the video signal and the source control signal. In addition, the source drive circuit 30 supplies a source signal to each of the plurality of source lines 12. The source drive circuit 30 supplies a source signal to each of the plurality of source lines 12. In addition, when the transistors 13 are supplied with a gate signal (when they are at a gate-on voltage), the source signal is written to the pixel electrodes 14 via the transistors 13. Accordingly, an electric field is generated between the pixel electrodes 14 and the common electrodes 15, the liquid crystal layer, which is not illustrated, is driven, and an image is displayed on the touch panel 1.

The plurality of common electrodes 15 are disposed in a matrix shape, for example, as illustrated in FIG. 3. The touch detection control circuit 40 is connected to each of the plurality of common electrodes 15 through wiring 16. Electrostatic capacitance of the common electrodes 15 changes due to capacitive coupling between the common electrodes and the pointer. The touch detection control circuit 40 supplies a touch drive signal (pulse signal) to the plurality of common electrodes 15 in a period in which the touch detection process is performed (touch detection period TP). A waveform of the pulse signal changes depending on the magnitude of the electrostatic capacitance of the common electrodes 15. The touch detection control circuit 40 detects a touch of the pointer (the position where the pointer touched) based on the waveform of the pulse signal from the common electrodes 15. That is, the common electrodes 15 also serve as touch detection electrodes. The touch panel 1 is a self-capacitive touch panel. Note that, the disclosure is not limited to this example, and the touch panel 1 may be configured as a mutual-capacitive touch panel.

Configuration of Gate Drive Circuit 20

Figure 4:
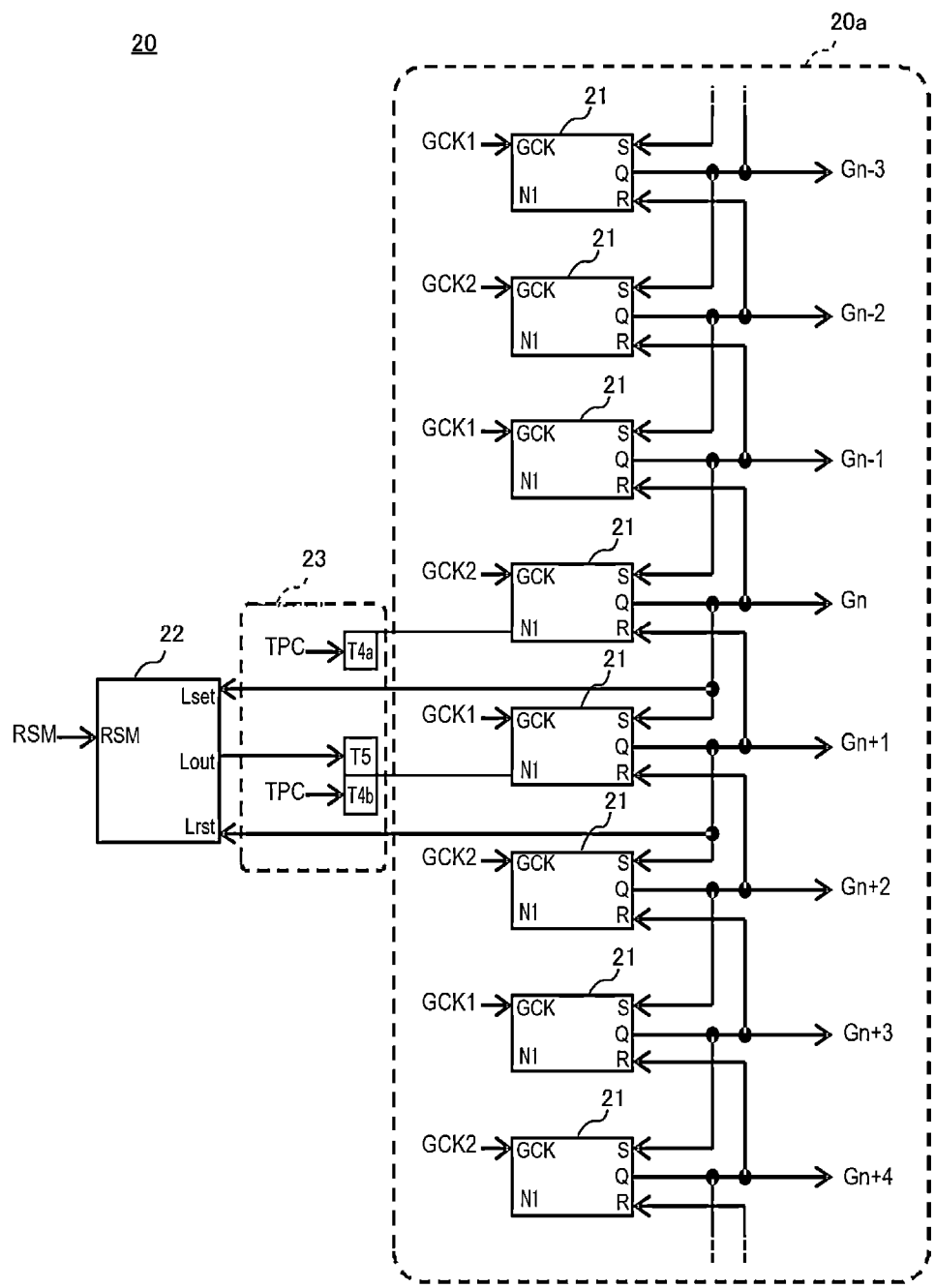
FIG. 4 is a diagram illustrating a configuration of a part of a gate drive circuit 20.
Figure 5:
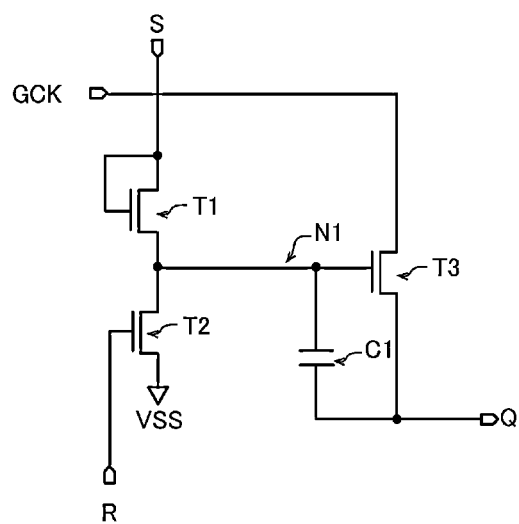
FIG. 5 is a circuit diagram of a unit circuit 21 constituting a stage other than an n-th stage and a (n+1)-th stage.
Figure 6:
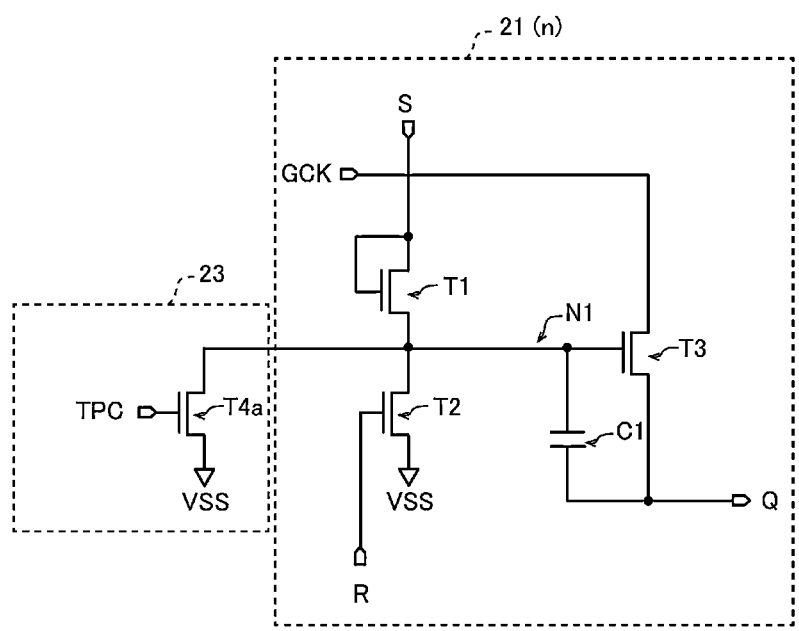
FIG. 6 is a circuit diagram illustrating a part of an n-th unit circuit 21 and connection circuit 23.
Figure 7:
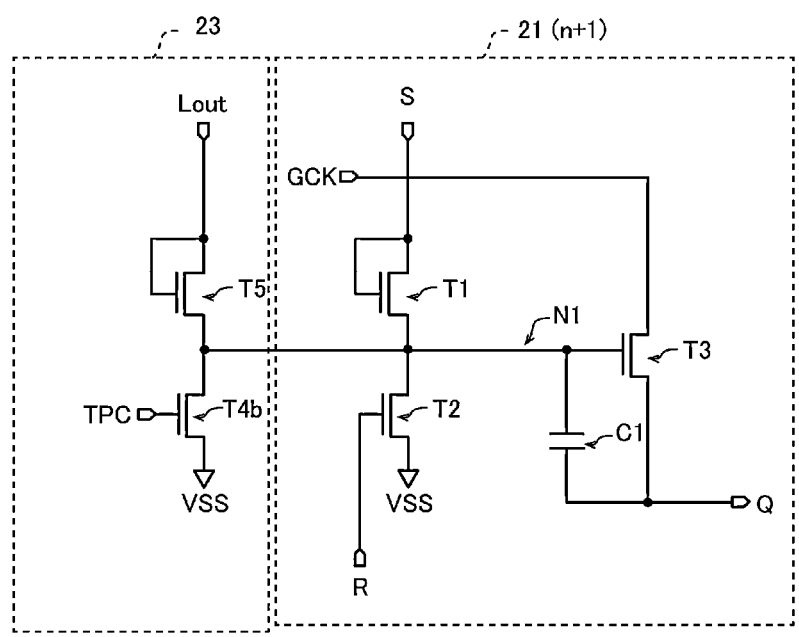
FIG. 7 is a circuit diagram illustrating a part of an (n+1)-th unit circuit 21 and connection circuit 23.
Figure 8:
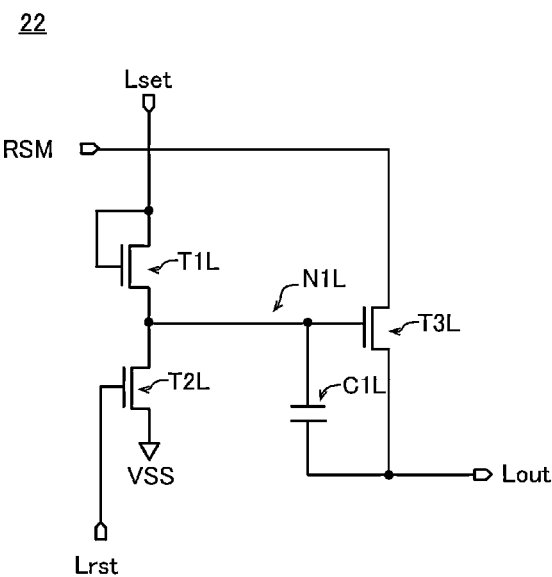
FIG. 8 is a circuit diagram illustrating a configuration of a latch circuit 22.

Next, a configuration of the gate drive circuit 20 will be described with reference to FIGS. 4 to 8. FIG. 4 is a diagram illustrating a configuration of a part of the gate drive circuit 20. FIG. 5 is a circuit diagram of a unit circuit 21 constituting stages other than an n-th and (n+1)-th stages. FIG. 6 is a circuit diagram illustrating a part of the n-th unit circuit 21 and a connection circuit 23. FIG. 7 is a circuit diagram illustrating a part of the (n+1)-th unit circuit 21 and the connection circuit 23. FIG. 8 is a circuit diagram illustrating a configuration of a latch circuit 22.

As illustrated in FIG. 4, the gate drive circuit 20 includes a shift register circuit 20a that has a plurality of stages and supplies a gate signal to the plurality of gate lines 11 in response to input of a plurality of clock signals. In FIG. 4, an n-th stage (n is a natural number), three stages preceding the n-th stage, and four stages following the n-th stage among the plurality of stages are illustrated. In addition, FIG. 4 illustrates a connection example in a case in which two-phase clock signals (a GCK1 signal and a GCK2 signal) are input to the shift register circuit 20a.

Configuration of Unit Circuit 21

The shift register circuit 20a includes a plurality of unit circuits 21 constituting the plurality of stages. As illustrated in FIG. 5, each unit circuit 21 includes transistors T1 to T3, a capacitive element C1, and a node N1.

The gate electrode and the drain electrode of the transistor T1 are connected to a terminal S to which a set signal is input. The source electrode of the transistor T1 is connected to the node N1. That is, the transistor T1 is diode-connected between the terminal S and the node N1. Thus, when the set signal is input, the transistor T1 charges the node N1.

The drain electrode of the transistor T2 is connected to the node N1. A VSS signal having a reference potential (low potential) is supplied to the source electrode of the transistor T2. The gate electrode of the transistor T2 is connected to a terminal R to which a reset signal is input. Thus, when the reset signal is input, the transistor T2 discharges the node N1.

The drain electrode of the transistor T3 is connected to a terminal GCK to which a clock signal is input. The gate electrode of the transistor T3 is connected to the node N1. The source electrode of the transistor T3 is connected to a terminal Q from which an output signal (gate signal G) is output. Note that, in FIG. 4, the gate signal output from the unit circuit 21 constituting the (n−3)-th stage is denoted by "Gn−3".

The capacitive element C1 is connected between the gate electrode of the transistor T3 and the source electrode of the transistor T3. The capacitive element C1 accumulates electric charge when the node N1 is charged. The capacitive element C1 is a bootstrap capacitor. In other words, when a clock signal is input to the drain electrode of the transistor T3 and the potential of the source electrode of the transistor T3 is increased, the potential of the node N1 is increased (bootstrapped) by the charge in the capacitive element C1.

As illustrated in FIG. 4, an output signal of the unit circuit 21 is output to the gate line 11 as a gate signal G, input to the terminal S of the unit circuit 21 constituting the next stage as a set signal, and input to the terminal R of the unit circuit 21 constituting the previous stage as a reset signal.

Note that, the "n-th stage" is an example of the "first stage" of the disclosure. In addition, the "(n+1)-th stage" is an example of the "second stage" of the disclosure. In addition, the "unit circuit constituting the n-th stage" is an example of the "first unit circuit" of the disclosure. In addition, the "unit circuit constituting the (n+1)-th stage" is an example of the "second unit circuit" and "third unit circuit" of the disclosure. In addition, the "unit circuit constituting the (n+2)-th stage" is an example of the "fourth unit circuit" of the disclosure.

Configuration of Connection Circuit 23

As illustrated in FIG. 6, the connection circuit 23 includes a transistor T4a. The drain electrode of the transistor T4a is connected to the node N1 of the unit circuit 21 constituting the n-th stage. A VSS signal is supplied to the source electrode of the transistor T4a. The gate electrode of the transistor T4a is connected to a terminal TPC that receives an input of a TPC signal which is a signal input when the operation of the gate drive circuit 20 is stopped. Accordingly, when the TPC signal is input to the transistor T4a, the unit circuit 21 constituting the n-th stage is discharged from the node N1, and the unit circuit 21 constituting the n-th stage is reset. Note that, the "TPC signal" is an example of the "second control signal" of the disclosure. In addition, the transistor T4a is an example of the "reset circuit" of the disclosure.

As illustrated in FIG. 4, an output signal of the unit circuit 21 constituting the n-th stage is output to the gate line 11 as a gate signal Gn, input to the terminal S of the unit circuit 21 constituting the (n+1)-th stage as a set signal, and input to the terminal R of the unit circuit 21 constituting the (n−1)-th stage as a reset signal. In addition, the output signal of the unit circuit 21 constituting the n-th stage is further input to a terminal Lset of the latch circuit 22 as a set signal.

As illustrated in FIG. 7, the connection circuit 23 includes a transistor T4b and a transistor T5. The drain electrode of the transistor T4b is connected to the node N1 of the unit circuit 21 constituting the (n+1)-th stage. A VSS signal is supplied to the source electrode of the transistor T4b. The gate electrode of the transistor T4b is connected to the terminal TPC. Accordingly, when the TPC signal is input to the transistor T4b, the unit circuit 21 constituting the (n+1)-th stage is discharged from the node N1, and the unit circuit 21 constituting the (n+1)-th stage is reset. Note that, the transistor T4b is an example of the "reset circuit" of the disclosure. In addition, the transistor T5 is an example of the "set circuit" of the disclosure.

The gate electrode and drain electrode of the transistor T5 are connected to a terminal Lout from which an output signal is output from the latch circuit 22. The source electrode of the transistor T5 is connected to the node N1. That is, the transistor T5 is diode-connected to the terminal Lout and the node N1. Thus, the transistor T5 charges the node N1 when the latch circuit 22 outputs an output signal.

As illustrated in FIG. 4, an output signal of the unit circuit 21 constituting the (n+1)-th stage is output to the gate line 11 as a gate signal Gn+1, input to the terminal S of the unit circuit 21 constituting the (n+2)-th stage as a set signal, and input to the terminal R of the unit circuit 21 constituting the n-th stage as a reset signal. In addition, the output signal of the unit circuit 21 constituting the (n+1)-th stage is further input to a terminal List of the latch circuit 22 as a reset signal.

Configuration of Latch Circuit 22

As illustrated in FIG. 4, the latch circuit 22 is connected to the plurality of unit circuits 21 in parallel. That is, the output signal from the unit circuit 21 constituting the n-th stage is input to the latch circuit 22 and is input to the unit circuit 21 constituting the (n+1)-th stage. In addition, the output signal from the unit circuit 21 constituting the (n+1)-th stage is input to the latch circuit 22 and is input to the unit circuit 21 constituting the (n+2)-th stage.

As illustrated in FIG. 8, the latch circuit 22 includes transistors T1L to T3L, a capacitive element C1L, and a node N1L.

The gate electrode and the drain electrode of the transistor T1L are connected to a terminal Lset to which a set signal is input. The source electrode of the transistor T1L is connected to the node NIL. That is, the transistor T1L is diode-connected to the terminal Lset and the node NIL. Thus, when the set signal is input, the transistor T1L charges the node N1L.

The drain electrode of the transistor T2L is connected to the node N1L. A VSS signal having a reference potential (low potential) is supplied to the source electrode of the transistor T2L. The gate electrode of the transistor T2L is connected to a terminal Lrst to which a reset signal is input. Thus, when the reset signal is input, the transistor T2L is discharged from the node N1L.

The drain electrode of the transistor T3L is connected to a terminal RSM that receives an input of an RSM signal that is a signal input when the operation of the gate drive circuit 20 is resumed. The gate electrode of the transistor T3L is connected to the node N1L. The source electrode of the transistor T3L is connected to a terminal Lout from which an output signal is output. Note that the "RSM signal" is an example of the "first control signal" of the disclosure. In addition, the terminal Lout is an example of the "output node" of the disclosure.

The capacitive element C1L is connected between the gate electrode of the transistor T3L and the source electrode of the transistor T3L. The capacitive element C1L accumulates electric charge when the node N1L is charged. The capacitive element C1L is a bootstrap capacitor. In other words, when the RSM signal is input to the drain electrode of the transistor T3L and the potential of the source electrode of the transistor T3L is increased, the potential of the node N1L is increased (bootstrapped) by the charge in the capacitive element C1L.

As illustrated in FIG. 4, the output signal from the latch circuit 22 is input to the gate electrode of the transistor T5 of the connection circuit 23.

Operation of Gate Drive Circuit 20

Next, operations of the gate drive circuit 20 will be described with reference to FIGS. 9 and 10. FIG. 9 is a timing chart of each signal of the gate drive circuit 20 by drive without pause. FIG. 10 is a timing chart of each signal of the gate drive circuit 20 by drive with a pause.

Drive without Pause

As illustrated in FIG. 9, when the drive without pause is performed, the control circuit 2 does not supply a TPC signal and an RSM signal to the gate drive circuit 20 (causes the gate drive circuit 20 to enter an off-level state).

At a time point t1, the node N1 of the unit circuit 21 constituting the n-th stage is charged by an output signal from the unit circuit 21 constituting the (n−1)-th stage. At a time point t2, a clock signal GCK2 is supplied to the unit circuit 21 constituting the n-th stage, and an output signal is output to the gate line 11, the latch circuit 22, and the unit circuit 21 constituting the (n+1)-th stage. At this time, the node N1L of the latch circuit 22 and the node N1 of the unit circuit 21 constituting the (n+1)-th stage are charged.

At a time point t3, a clock signal GCK1 is supplied to the unit circuit 21 constituting the (n+1)-th stage, and an output signal is output to the gate line 11, the latch circuit 22, and the unit circuit 21 constituting the (n+2)-th stage. Since the output signal from the unit circuit 21 constituting the (n+1)-th stage is input to the latch circuit 22 as a reset signal, the node N1L is discharged (reset). After that, a gate signal G is sequentially output to the gate line 11 from the unit circuit 21 of the (n+2)-th stage and thereafter.

Drive with Pause

As illustrated in FIG. 10, in the case of performing drive with a pause, the control circuit 2 supplies a TPC signal to the gate drive circuit 20 at the start of a pause period TR and supplies an RSM signal to the gate drive circuit 20 at the end of the pause period TR. Note that, during the pause period TR, a touch detection process is performed.

At a time point t11, the node N1 of the unit circuit 21 constituting the n-th stage is charged by an output signal from the unit circuit 21 constituting the (n−1)-th stage. At a time point t12, a clock signal GCK2 is supplied to the unit circuit 21 constituting the n-th stage, and an output signal is output to the gate line 11, the latch circuit 22, and the unit circuit 21 constituting the (n+1)-th stage. At this time, the node N1L of the latch circuit 22 and the node N1 of the unit circuit 21 constituting the (n+1)-th stage are charged.

At a time point t13, the pause period TR is started, and the TPC signal is input to the connection circuit 23. Thus, the node N1 of the unit circuit 21 constituting the n-th stage and the node N1 of the unit circuit 21 constituting the (n+1)-th stage are reset by the time point t14. Note that the node N1L remains charged.

At a time point t15, the RSM signal is input to the latch circuit 22. As a result, the output signal from the terminal Lout of the latch circuit 22 is supplied to the node N1 of the unit circuit 21 constituting the (n+1)-th stage via the transistor T5 of the connection circuit 23. The node N1 of the unit circuit 21 constituting the (n+1)-th stage is charged.

At a time point t16, the clock signal GCK1 is supplied to the unit circuit 21 constituting the (n+1)-th stage, and the unit circuit 21 constituting the (n+1)-th stage outputs an output signal. The latch circuit 22 is reset by the output signal from the unit circuit 21 constituting the (n+1)-th stage, and the unit circuit 21 constituting the (n+2)-th stage is charged. Thereafter, each time the clock signals (GCK1 and GCK2) are supplied, the gate signals are sequentially output from the respective stages.

As described above, the gate drive circuit 20 according to the first embodiment can execute both the drive without pause (see FIG. 9) and the drive with a pause (see FIG. 10) depending on whether the TPC signal and the RSM signal are supplied.

Second Embodiment

Figure 11:
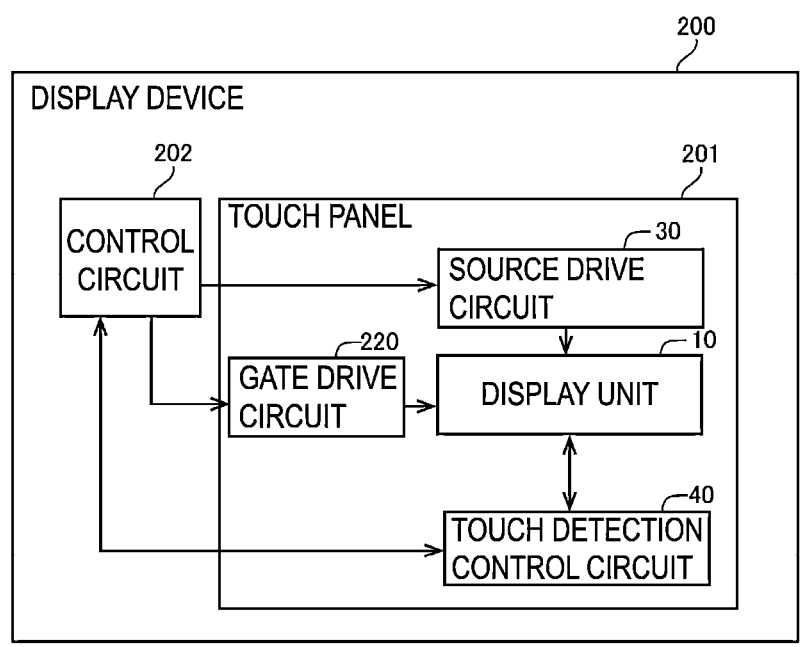
FIG. 11 is a block diagram of a display device 200 according to a second embodiment.
Figure 12:
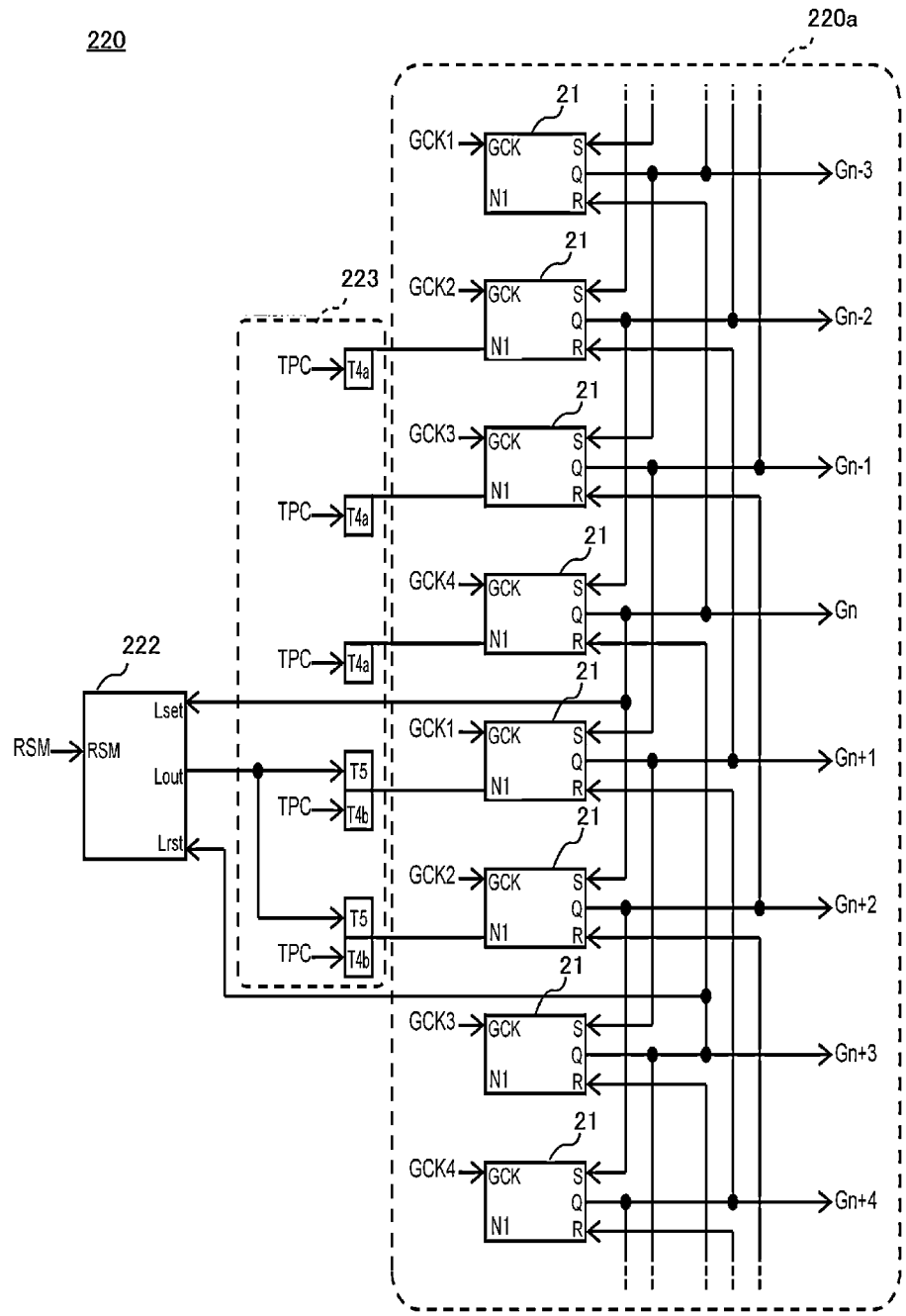
FIG. 12 is a diagram illustrating a configuration of a gate drive circuit 220 of the display device 200 according to the second embodiment.
Figure 13:
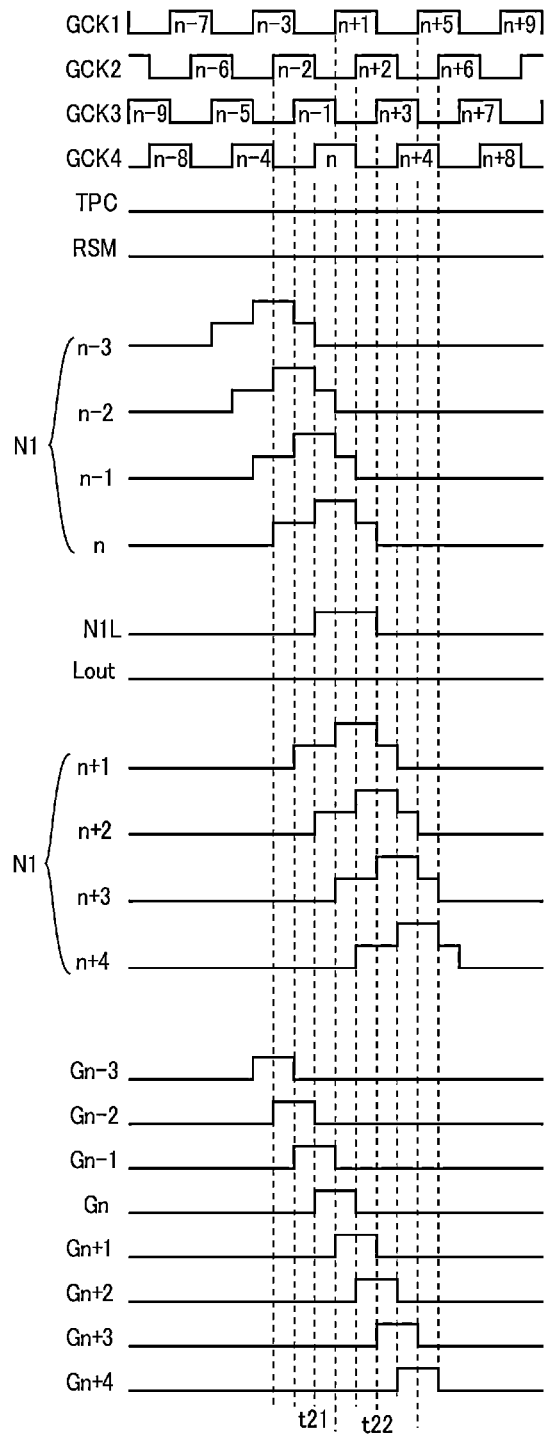
FIG. 13 is a timing chart when the gate drive circuit 220 according to the second embodiment performs drive without pause.
Figure 14:
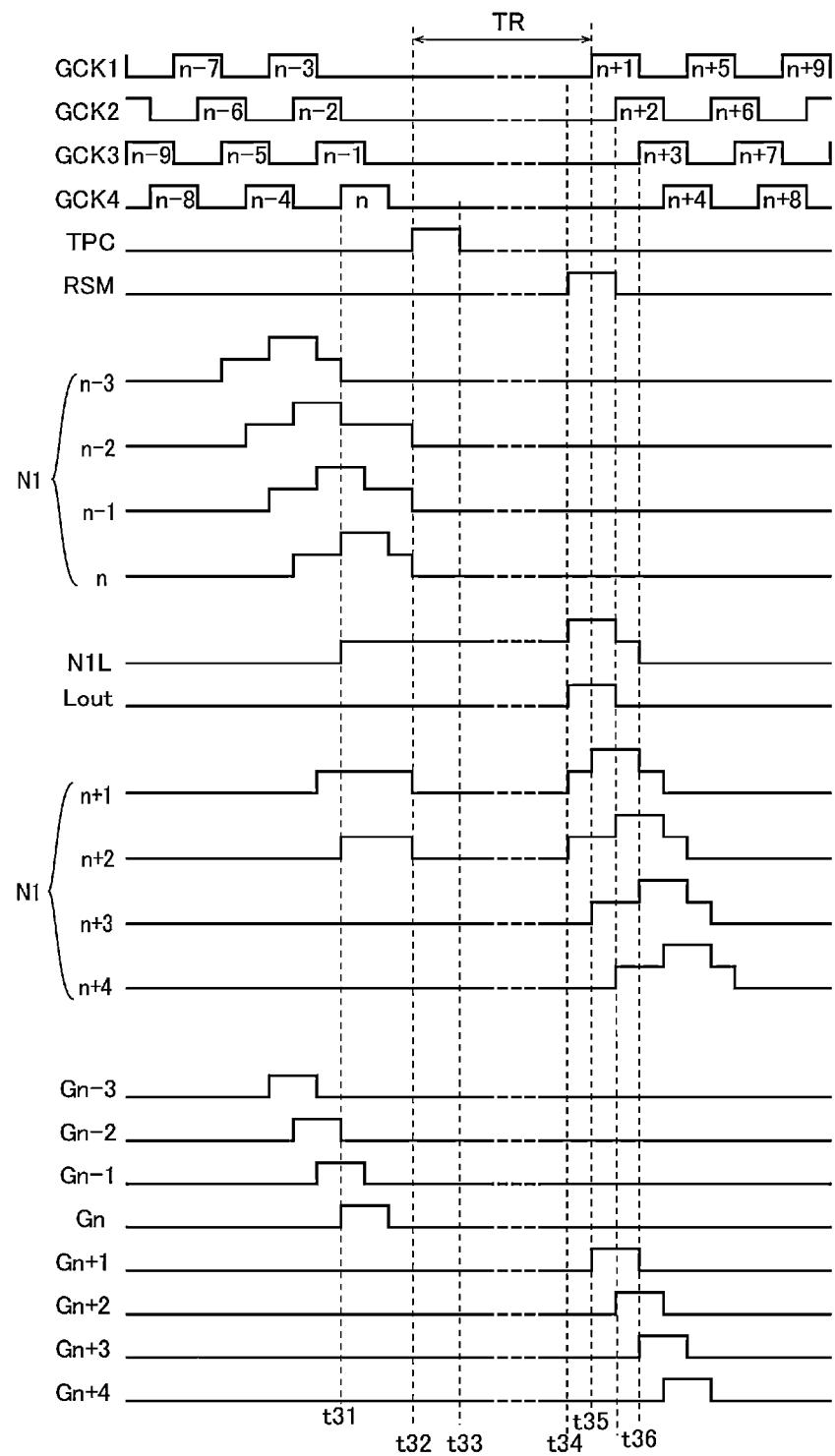
FIG. 14 is a timing chart when the gate drive circuit 220 according to the second embodiment performs drive with a pause.

Next, a configuration of a display device 200 according to a second embodiment will be described with reference to FIGS. 11 to 14. The second embodiment is a configuration example in which four-phase clock signals are input to a shift register circuit 220a. Note that, constituents that are the same as those in the first embodiment are denoted by the same reference signs, and description thereof will be omitted. FIG. 11 is a block diagram of the display device 200 according to the second embodiment. FIG. 12 is a diagram illustrating a configuration of a gate drive circuit 220 of the display device 200 according to the second embodiment. FIG. 13 is a timing chart when the gate drive circuit 220 according to the second embodiment performs drive without pause. FIG. 14 is a timing chart when the gate drive circuit 220 according to the second embodiment performs drive with a pause.

As illustrated in FIG. 11, the display device 200 includes a control circuit 202 and the gate drive circuit 220. In the second embodiment, the control circuit 202 inputs four-phase clock signals (GCK1 to GCK4) to the gate drive circuit 220. The gate drive circuit 220 includes a shift register circuit 220a, a latch circuit 222, and a connection circuit 223. Four-phase clock signals (GCK1 to GCK4) are input to the shift register circuit 220a. In addition, each the unit circuit 21 of the shift register circuit 220a inputs an output signal to a terminal S of the unit circuit 21 constituting the stage two stages below and to a terminal R of the unit circuit 21 constituting the stage three stages above. In addition, the output signal of the unit circuit 21 constituting the (n+3)-th stage is input to a terminal List of the latch circuit 222 as a reset signal.

The connection circuit 223 includes a transistor T4a connected to a node N1 of the unit circuit 21 constituting the (n−2)-th stage, a transistor T4a connected to a node N1 of the unit circuit 21 constituting the (n−1)-th stage, and a transistor T4a connected to a node N1 of the unit circuit 21 constituting the n-th stage. In addition, the connection circuit 223 includes a transistor T4b and a transistor T5 connected to a node N1 of the unit circuit 21 constituting the (n+1)-th stage, and a transistor T4b and a transistor T5 connected to a node N1 of the unit circuit 21 constituting the (n+2)-th stage.

A terminal Lout of the latch circuit 222 is connected to each of the two transistors T5.

As illustrated in FIG. 13, when a clock signal GCK4 is supplied to the unit circuit 21 constituting the n-th stage at a time point t21, an output signal from the unit circuit 21 is input to a terminal Lset of the latch circuit 222 and the unit circuit 21 constituting the (n+2)-th stage. Thus, the node N1L and the node N1 of the unit circuit 21 constituting the (n+2)-th stage are charged. Then, when a clock signal GCK3 is supplied to the unit circuit 21 constituting the (n+3)-th stage at a time point t22, an output signal from the unit circuit 21 is input to the terminal List of the latch circuit 222 and the unit circuit 21 constituting the n-th stage. As a result, the latch circuit 222 and the unit circuit 21 constituting the n-th stage are reset. After that, a gate signal G is sequentially output to the gate line 11 from the unit circuit 21 of the (n+4)-th stage and thereafter.

As illustrated in FIG. 14, when a clock signal GCK4 is supplied to the unit circuit 21 constituting the n-th stage at a time point t31, an output signal from the unit circuit 21 is input to the terminal Lset of the latch circuit 222 and the unit circuit 21 constituting the (n+2)-th stage. Thus, the node N1L and the node N1 of the unit circuit 21 constituting the (n+2)-th stage are charged. Thereafter, when a TPC signal is input to the connection circuit 223 at the time point t32, the nodes N1 of the unit circuits 21 in the (n−2)-th to (n+2)-th stages are reset by a time point t33. Then, during the pause period TR, the operation of the gate drive circuit 220 is stopped, and an RSM signal is input to the latch circuit 222 at the time point t34. As a result, the output signal from the terminal Lout of the latch circuit 222 is input to the nodes N1 of the unit circuits 21 constituting the (n+1)-th and (n+2)-th stages via the transistor T5 of the connection circuit 223.

At a time point t35, the clock signal GCK1 is input to the unit circuit 21 constituting the (n+1)-th stage, then the unit circuit 21 outputs an output signal (gate signal Gn+1), and thereby the pause period TR ends. Thereafter, at a time point t36, an output signal from the unit circuit 21 constituting the (n+3)-th stage is input to the latch circuit 222 as a reset signal, and thereby the latch circuit 222 is reset. After that, a gate signal G is sequentially output to the gate line 11 from the unit circuit 21 of the (n+4)-th stage and thereafter.

As described above, according to the second embodiment, even when the four-phase clock signals are input to the shift register circuit 220a, it is possible to switch between drive without pause and drive with a pause depending on whether the RSM signal is input to the latch circuit 222 and the TPC signal is input to the connection circuit 223. Note that, the other configurations and effects of the second embodiment are similar to those of the first embodiment.

Modified Example of Second Embodiment

Figure 15:
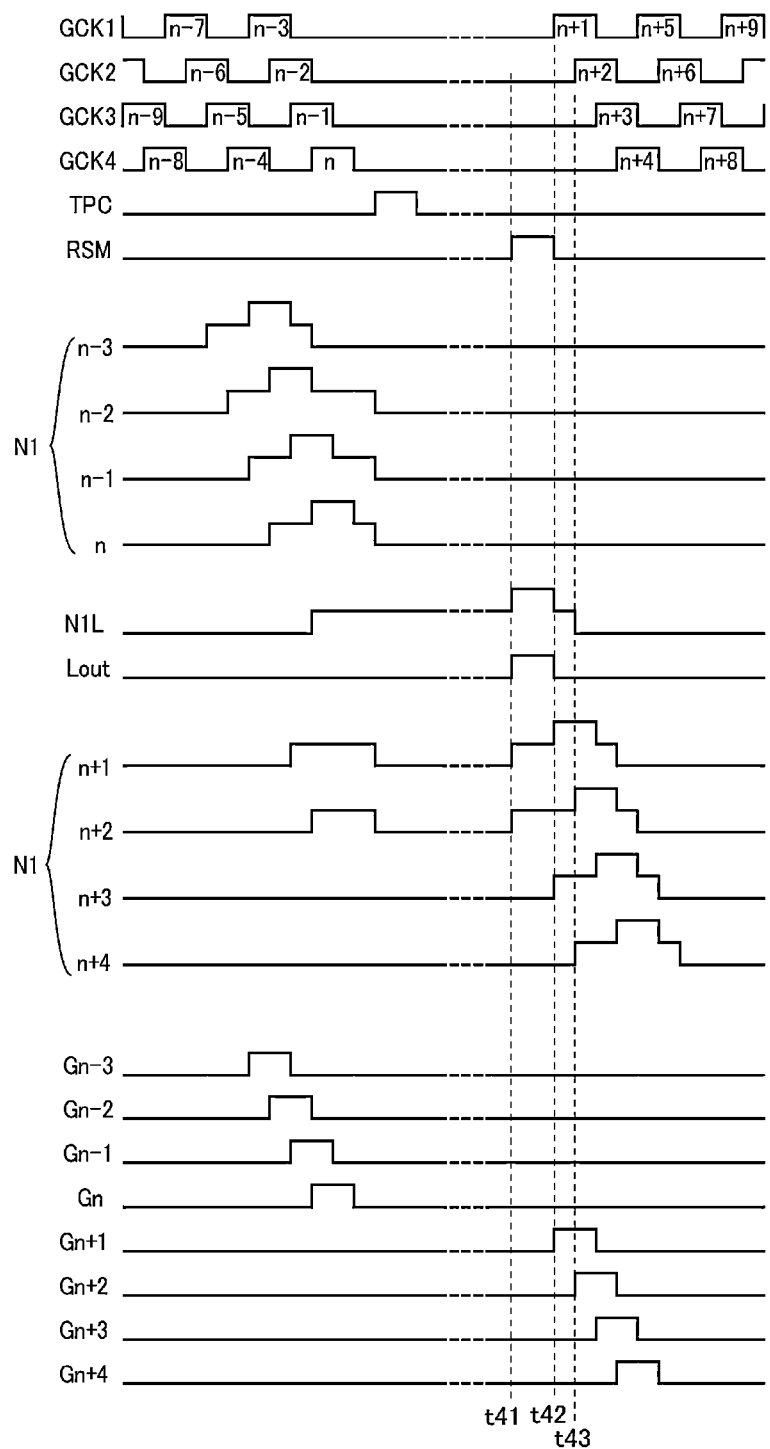
FIG. 15 is a timing chart illustrating a display device according to a modified example of the second embodiment.

Next, a display device according to a modified example of the second embodiment will be described with reference to FIG. 15. FIG. 15 is a timing chart of a display device according to a modified example of the second embodiment.

Although the time point t34 at which the RSM signal is input to the latch circuit 222 is one horizontal synchronization signal earlier than the time point t35 at which input of the clock signal GCK1 is resumed in the second embodiment as illustrated in FIG. 14, a time point t41 at which an RSM signal is input to the latch circuit 222 may be two horizontal synchronization signals earlier than a time point t42 at which input of a clock signal GCK1 is resumed as illustrated in FIG. 15. In this case, the latch circuit 222 may be reset by using an output signal from the unit circuit 21 constituting the (n+2)-th stage as a reset signal as illustrated in FIG. 15.

Third Embodiment

Figure 16:
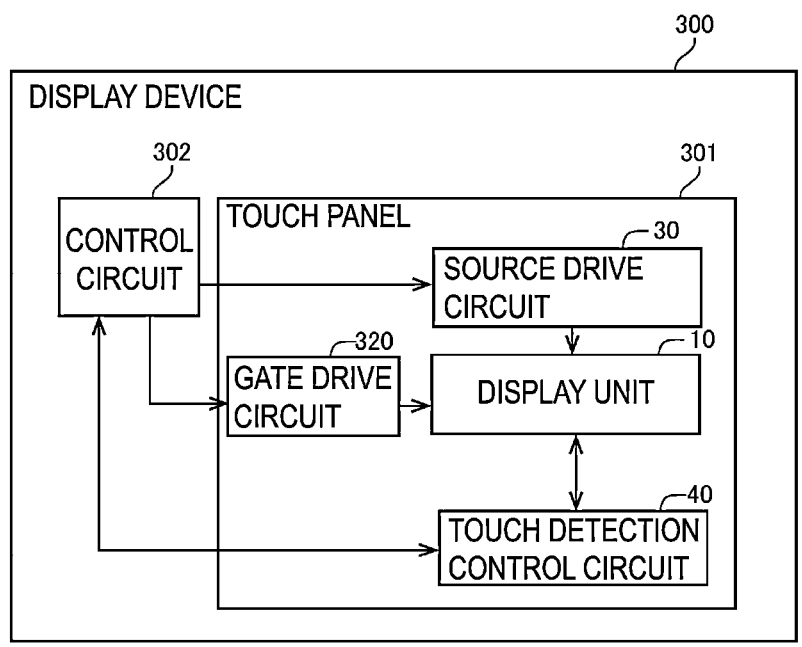
FIG. 16 is a block diagram of a display device 300 according to a third embodiment.
Figure 17:
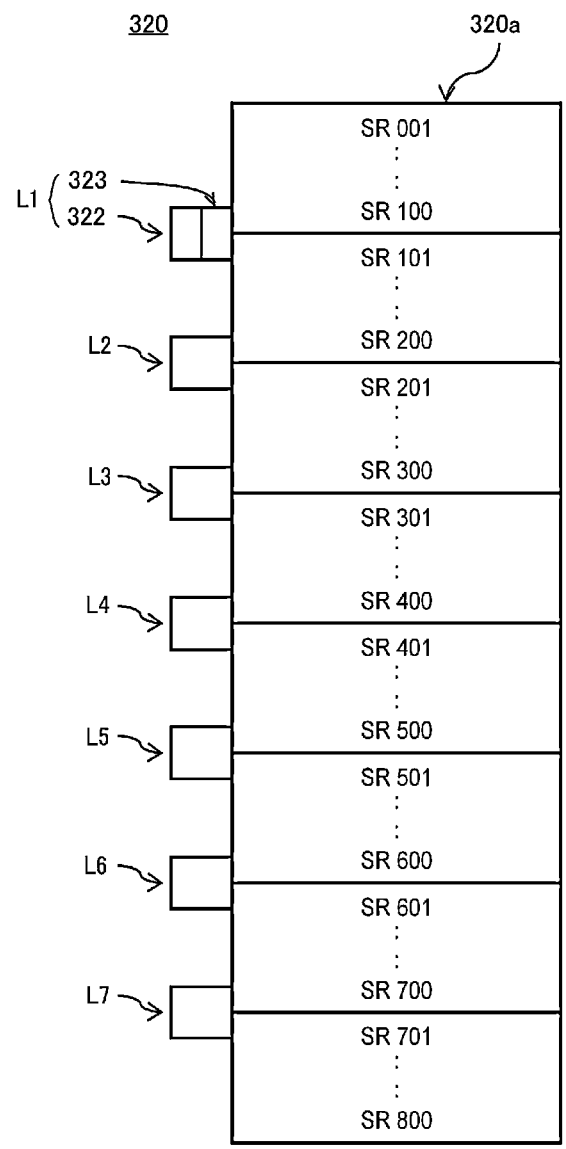
FIG. 17 is a diagram illustrating a configuration of a gate drive circuit 320 of the display device 300 according to the third embodiment.
Figure 18:
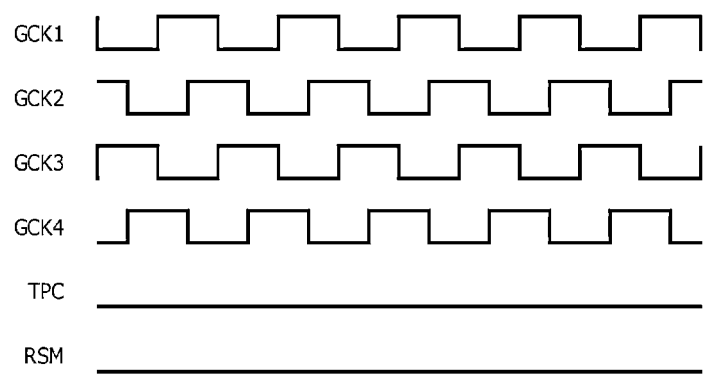
FIG. 18 is a timing chart related to an operation of circuits other than operating circuits according to the third embodiment.
Figure 19:
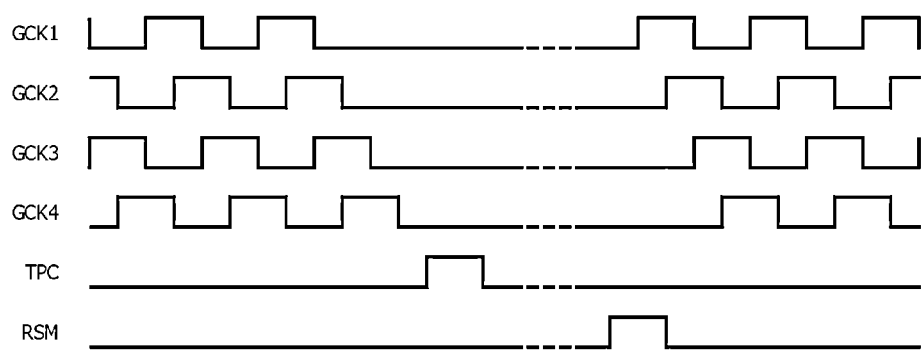
FIG. 19 is a timing chart related to an operation of the operating circuits according to the third embodiment.

Next, a configuration of a display device 300 of a third embodiment will be described with reference to FIGS. 16 to 19. In the third embodiment, a plurality of latch circuits 322 and a plurality of connection circuits 323 are connected in parallel with a shift register circuit 320a. In addition, the gate drive circuit 320 is configured such that only a determined latch circuit 322 among the plurality of latch circuits 322 is operated. Note that, constituents that are the same as those in the first embodiment are denoted by the same reference signs, and description thereof will be omitted. FIG. 16 is a block diagram of the display device 300 according to the third embodiment. FIG. 17 is a diagram illustrating a configuration of a gate drive circuit 320 of the display device 300 according to the third embodiment. FIG. 18 is a timing chart related to an operation of circuits other than operating circuits according to the third embodiment. FIG. 19 is a timing chart related to an operation of the operating circuits according to the third embodiment.

The display device 300 includes a control circuit 302 and the gate drive circuit 320 as illustrated in FIG. 16. The gate drive circuit 320 includes a shift register circuit 320a, and the plurality of latch circuits 322 and the plurality of connection circuits 323 connected in parallel with the shift register circuit 320a as illustrated in FIG. 17. The shift register circuit 320a includes a plurality of (for example, 800) unit circuits 21 (see FIG. 5). The latch circuits 322 and the connection circuits 323 are disposed in each of a predetermined number of stages (e.g., 100 stages) of the shift register circuit 320a. For example, seven latch circuits 322 and seven connection circuits 323 are provided in the gate drive circuit 320. The latch circuit 322 and the connection circuit 323 connected to the unit circuit 21 constituting the 100th stage of the shift register circuit 320a are set as a "latch unit L1", and the subsequent latch circuits 322 and connection circuits 323 are set as a "latch unit L2", . . . , and a "latch unit L7".

In the third embodiment, the control circuit 302 is configured to be able to execute control in four modes of basic drive, intermittent drive, alternating drive, and drive without pause as modes for operating the gate drive circuit 320. The control circuit 302 switches between the four modes by determining an operating circuit from among the latch units L1 to L7 to be operated. A TPC signal and an RSM signal are input to the latch unit determined to be an operating circuit among the latch units L1 to L7 as illustrated in FIG. 19, and the operation of the gate drive circuit 320 is stopped. Neither the TPC signal nor RSM signal are input to the latch units other than the latch unit determined to be an operating circuit among the latch units L1 to L7 as illustrated in FIG. 18, and the operation of the gate drive circuit 320 is not stopped.

The "basic drive" is a driving method in which all of the latch units L1 to L7 are determined to be operating circuits and the operation of the gate drive circuit 320 is stopped in all of the latch units L1 to L7. The "intermittent drive" is a driving method in which some of the latch units L1 to L7 (for example, only L2, L4, and L6) are determined to be operating circuits, and the operation of the gate drive circuit 320 is stopped only in the some of the latch units L1 to L7. The "alternating drive" is a driving method in which operating circuits vary for each frame. For example, the control circuit 302 determines the latch units L2, L4, and L6 as operating circuits in odd-numbered frames, and determines the latch units L1, L3, L5, and L7 as operating circuits in even-numbered frames. The "drive without pause" is a driving method in which none of the latch units L1 to L7 are determined to be operating circuits.

According to the third embodiment, the operation of the gate drive circuit 320 can be continued by a latch unit other than an operating circuit among the latch units L1 to L7, and the operation of the gate drive circuit 320 can be stopped by the operating circuit. The stage in which the operation of the gate drive circuit 320 is stopped can be arbitrarily set in accordance with the four modes of basic drive, intermittent drive, alternating drive, and drive without pause. Note that, the other configurations and effects of the third embodiment are similar to those of the first embodiment.

Modifications, Etc.

The above-described embodiments are merely examples for carrying out the disclosure. Accordingly, the disclosure is not limited to the embodiments described above and can be implemented by modifying the embodiments described above as appropriate without departing from the scope of the disclosure.

(1) Although the example in which the capacitive element (bootstrap capacitor) is provided in each unit circuit is introduced in the above-described first to third embodiments, the disclosure is not limited to this example. For example, the capacitance component of the transistor T3 may be substituted for the function of the capacitive element C1 described in the first to third embodiments.

(2) Although the example in which the gate drive circuit is provided in the display device that performs drive without pause and drive with a pause is introduced in the first and second embodiments, the disclosure is not limited to this example. That is, the gate drive circuit may be provided in a display device which performs only drive without pause or may be provided in a touch panel which performs only drive with a pause. That is, the gate drive circuit of the disclosure can be mounted on devices having various specifications.

(3) Although the example of connection in the gate drive circuit is introduced in the first to third embodiments, the disclosure is not limited to this example. That is, the connection configuration (input destination of the set signal and the reset signal) in the gate drive circuit may be changed in accordance with the number of phases of the clock signals.

(4) Although the example in which the touch detection function is provided in the display device is introduced in the first to third embodiments, the disclosure is not limited to this example. In other words, the touch detection function may not be provided in the display device.

(5) Although the example in which the display device is constituted by a liquid crystal display panel including a liquid crystal layer is introduced in the first to fourth embodiments, the disclosure is not limited to this example. The display device may be configured by, for example, an organic electro-luminescence (EL) display panel, for example.

The above-described drive circuit, display device, in-cell touch panel device, and control device for a drive circuit can be described as follows.

A drive circuit according to a first configuration is a drive circuit that includes a plurality of stages and supplies a drive signal to a scanning signal line group in response to input of a plurality of clock signals. The derive circuit includes a plurality of unit circuits that respectively constitute the plurality of stages and that output the drive signal, a latch circuit provided in parallel with the plurality of unit circuits, and a connection circuit connected to an output node of the latch circuit. The latch circuit is configured such that, when a first output signal from a first unit circuit constituting a first stage among the plurality of unit circuits is input as a first set signal and a first control signal that resumes an operation of the drive circuit is input after the first set signal is input, the latch circuit outputs a latch circuit output signal to the connection circuit via the output node, and a second output signal from a second unit circuit constituting a second stage among stages subsequent to the first stage among the plurality of unit circuits is input as a first reset signal. The connection circuit includes a reset circuit that resets the first unit circuit and a third unit circuit constituting a stage next to the first stage among the plurality of unit circuits in response to input of a second control signal that stops an operation of the drive circuit, and a set circuit that supplies the latch circuit output signal to the third unit circuit as a second set signal (first configuration).

According to the first configuration, since the latch circuit is connected in parallel with the plurality of unit circuits, unless the second control signal that stops the operation of the drive circuit is supplied to the drive circuit, the operation of the drive circuit is not stopped by the latch circuit, and the operation of the drive circuit can be continued. In addition, when the second control signal is supplied to the drive circuit, the operation of the drive circuit can be stopped, and when the first control signal is supplied to the drive circuit, the operation of the drive circuit can be resumed. As a result, it is possible to arbitrarily set whether the latch circuit stops the operation of the drive circuit.

In the first configuration, the third unit circuit may include an internal node, a first transistor that charges the internal node in response to input of the first output signal from the first unit circuit, a second transistor that outputs the drive signal to any one of scanning signal lines of the scanning signal line group when any one of the plurality of clock signals is input in a state in which the internal node is charged, and a third transistor that discharges the internal node in response to input of a second reset signal from a fourth unit circuit constituting a stage subsequent to the stage constituted by the third unit circuit. The reset circuit and the set circuit may be connected to the internal node. The reset circuit may be configured to discharge the internal node in response to the input of the second control signal. The set circuit may be configured to charge the internal node in response to input of the latch circuit output signal (second configuration).

According to the second configuration, the reset circuit can directly discharge the internal node of the third unit circuit. In addition, the set circuit can directly charge the internal node of the third unit circuit. Therefore, it is not necessary to provide a separate circuit between the reset circuit and the third unit circuit and between the set circuit and the third unit circuit.

In the first or second configuration, the second stage constituted by the second unit circuit may be the stage next to the first stage. The third unit circuit may also serve as the second unit circuit (third configuration).

According to the third configuration, it is possible to prevent the configuration of the drive circuit from being complicated.

In the first or second configuration, the second stage constituted by the second unit circuit may be the stage subsequent to the stage constituted by the third unit circuit (fourth configuration).

According to the fourth configuration, even when the number of phases of the plurality of clock signals is large, it is possible to input the second output signal from the second unit circuit to the latch circuit to reset the latch circuit.

A display device according to a fifth configuration includes the drive circuit described in any one of the first to seventh configurations, and a display in which the scanning signal line group is disposed (fifth configuration).

According to the fifth configuration, it is possible to provide a display device capable of arbitrarily setting whether to stop an operation of the drive circuit by using the latch circuit.

An in-cell touch panel device according to a sixth configuration includes the drive circuit according to any one of the first to seventh configuration, and an in-cell touch panel that is provided with the scanning signal line group and detects a touch of a pointer in a period in which an operation of the drive circuit is stopped (sixth configuration).

According to the sixth configuration, it is possible to provide an in-cell touch panel device capable of arbitrarily setting whether to stop an operation of the drive circuit by using the latch circuit.

A control device for a drive circuit according to a seventh configuration is a control device for a drive circuit that supplies the plurality of clock signals, the first control signal, and the second control signal to the drive circuit of any one of the first to fourth configurations. The drive circuit includes a plurality of latch circuits provided in parallel with the plurality of unit circuits, and a plurality of connection circuits connected to output nodes of the plurality of latch circuits, respectively. The control device for the drive circuit determines an operation connection circuit to be operated from among the plurality of connection circuits, and supplies the second control signal to the operation connection circuit to be operated without supplying the second control signal to a connection circuit other than the operation connection circuit to be operated among the plurality of connection circuits (seventh configuration).

Here, since the position (stage) in which a display device of the related art stops its operation is fixed, the position cannot be changed. In contrast, according to the seventh configuration, an operation of the drive circuit can be continued by a circuit other than the operation connection circuit among the plurality of connection circuits, and the operation of the drive circuit can be stopped by the operation connection circuit. With this configuration, the stage (position) in which the operation is stopped can be arbitrarily changed in accordance with the operation connection circuit determined from among the plurality of connection circuits.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A drive circuit including a plurality of stages and configured to supply a drive signal to a scanning signal line group in response to input of a plurality of clock signals, the drive circuit comprising:
  a plurality of unit circuits forming, respectively, the plurality of stages, the plurality of unit circuits being configured to output the drive signal;
  a latch circuit provided in parallel with the plurality of unit circuits; and
  a connection circuit connected to an output node of the latch circuit,
  wherein the latch circuit:
    receives, as a first set signal, an input of a first output signal from a first unit circuit, among the plurality of unit circuits, that forms a first stage, among the plurality of stages, outputs a latch circuit output signal to the connection circuit via the output node when a first control signal that resumes an operation of the drive circuit is input after the first set signal is input, and receives, as a first reset signal, an input of a second output signal from a second unit circuit, among the plurality of unit circuits, that forms a second stage among stages of the plurality of stages that are subsequent to the first stage, and the connection circuit includes:
  a reset circuit configured to reset the first unit circuit and a third unit circuit, among the plurality of unit circuits, that forms a stage, among the plurality of stages, that is next to the first stage in response to an input of a second control signal that stops the operation of the drive circuit, and
  a set circuit configured to supply the latch circuit output signal to the third unit circuit, as a second set signal.

2. The drive circuit according to claim 1,
wherein the third unit circuit includes:
  an internal node,
  a first transistor configured to charge the internal node in response to the input of the first output signal received from the first unit circuit,
  a second transistor configured to output the drive signal to any one scanning signal line of the scanning signal line group when any one of the plurality of clock signals is input in a state in which the internal node is charged, and
  a third transistor configured to discharge the internal node in response to an input of a second reset signal received from a fourth unit circuit forming a stage, among the plurality of stages, that is subsequent to the stage formed by the third unit circuit,
the reset circuit and the set circuit are connected to the internal node,
the reset circuit discharges the internal node in response to receiving the input of the second control signal, and
the set circuit charges the internal node in response to receiving an input of the latch circuit output signal.

3. The drive circuit according to claim 1,
wherein the second stage configured by the second unit circuit is next to the first stage, and
the third unit circuit also serves as the second unit circuit.

4. The drive circuit according to claim 1,
wherein the second stage formed by the second unit circuit is subsequent to a stage, among the plurality of stages, that is formed by the third unit circuit.

5. A display device comprising:
the drive circuit according to claim 1; and
a display in which the scanning signal line group is disposed.

6. An in-cell touch panel device comprising:
the drive circuit according to claim 1; and
an in-cell touch panel provided with the scanning signal line group, the in-cell touch panel being configured to detect a touch of a pointer within a period of time in which the operation of the drive circuit is stopped.

7. A control device for a drive circuit, the control device being configured to supply, to the drive circuit according to claim 1, the plurality of clock signals, the first control signal, and the second control signal,
wherein the drive circuit further comprises:
  a plurality of latch circuits, including the latch circuit, provided in parallel with the plurality of unit circuits, and
  a plurality of connection circuits, including the connection circuit, connected to output nodes of the plurality of latch circuits, respectively, wherein the control device for the drive circuit:
determines an operation connection circuit to be operated by one or more of the plurality of connection circuits, and
supplies the second control signal to the operation connection circuit, without supplying the second control signal to any connection circuit, among the plurality of connection circuits, other than the operation connection circuit.

* * * * *